(12) United States Patent
Kush

(10) Patent No.: US 6,874,144 B1
(45) Date of Patent: Mar. 29, 2005

(54) SYSTEM, METHOD, AND PROGRAM FOR IMPLEMENTING PRIORITY INHERITANCE IN AN OPERATING SYSTEM

(75) Inventor: Christopher Starbuck Kush, Walnut, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/286,173

(22) Filed: Apr. 5, 1999

(51) Int. Cl.[7] .............................................. G06F 9/46
(52) U.S. Cl. ................... 718/103; 718/100; 718/102
(58) Field of Search ................................ 709/108, 102, 709/103, 104, 106, 107, 100; 713/400

(56) References Cited

U.S. PATENT DOCUMENTS

| | | | |
|---|---|---|---|
| 4,658,351 A | * | 4/1987 | Teng ........................... 709/103 |
| 5,220,653 A | | 6/1993 | Miro |
| 5,247,675 A | * | 9/1993 | Farrell et al. ................ 709/103 |
| 5,442,758 A | | 8/1995 | Slingwine et al. |
| 5,452,452 A | * | 9/1995 | Gaetner et al. ............. 709/103 |
| 5,515,538 A | * | 5/1996 | Kleiman ..................... 710/260 |
| 5,519,867 A | * | 5/1996 | Moeller et al. ............. 709/103 |
| 5,524,247 A | | 6/1996 | Mizuno |
| 5,623,663 A | | 4/1997 | Morgan et al. |
| 5,630,128 A | * | 5/1997 | Farrell et al. ................ 709/103 |
| 5,721,922 A | | 2/1998 | Dingwall |
| 5,822,588 A | | 10/1998 | Sterling et al. |
| 5,826,081 A | | 10/1998 | Zolnowsky |
| 5,845,116 A | * | 12/1998 | Saito et al. .................. 709/103 |
| 5,937,187 A | * | 8/1999 | Kosche et al. .............. 709/104 |
| 5,937,205 A | * | 8/1999 | Mattson et al. ................ 710/6 |
| 5,953,530 A | * | 9/1999 | Rishi et al. .................... 714/38 |
| 6,029,190 A | * | 2/2000 | Oliver ......................... 709/107 |
| 6,108,683 A | * | 8/2000 | Kamada et al. ............. 709/102 |
| 6,157,963 A | * | 12/2000 | Courtright et al. ............. 710/5 |
| 6,212,544 B1 | * | 4/2001 | Borkenhagen et al. ...... 709/103 |
| 6,263,359 B1 | * | 7/2001 | Fong et al. .................. 709/103 |
| 6,560,627 B1 | * | 5/2003 | McDonald et al. .......... 709/103 |
| 6,560,628 B1 | * | 5/2003 | Murata ........................ 709/103 |
| 6,587,955 B1 | * | 7/2003 | Foote et al. ................. 713/400 |

FOREIGN PATENT DOCUMENTS

EP        0790557        8/1997

OTHER PUBLICATIONS

Lui Sha et al. Priority Inheritance Protocols: An Approach to Real–Time Synchronization. 1990. IEEE. p. 1175–1185.*
Jahong Shim. Priority Inversion Handling in Microkernel–based Real–Time Mike. 1996. IEEE. p. 238–245.*
Tatsuo Nakajima et al. Integrated Management of Priority Inversion in Real–Time Mach. 1993. IEEE. p. 120–130.*
Hideyuki Tokuda et al. Priority Inversions in Real–Time Communication. 1989. IEEE. p. 348–359.*
Lui Sha et al. Priority Inheritance Protocols: An Approach to Real–Time Syncrhonization. 1990. IEEE. p. 1175–1185.*
Abstract Japanese Patent No. JP 05–204675, Aug. 13, 1993, Satoshi Mizuno, "Scheduling System".
Abstract of article, Journal of Digital Imaging, v. 10, n. 3 Suppl 1, Ghosh Srinka et al., "Optimization of a low–cost truly preemptive multitasking PC diagnostic workstation", Aug. 1997, pp. 171–174.

(Continued)

Primary Examiner—Ayaz Sheikh
Assistant Examiner—Christian LaForgia
(74) Attorney, Agent, or Firm—David W. Victor; Konrad Raynes & Victor LLP

(57) ABSTRACT

Disclosed is a method, system, and program for implementing priority inheritance in an operating system. A first list includes a boost request to boost a priority of an indicated thread holding a shared resource to an indicated priority. Further included is a second list. The system processes the boost request in the first list to boost the priority of the indicated thread to the indicated priority. After boosting priority, the system removes the processed boost request from the first list and places the processed boost request in the second list.

21 Claims, 10 Drawing Sheets

OTHER PUBLICATIONS

Abstract of conference paper, USENIX Mach Syposium, Monterey, CA, H. Tokuda et al., "Evaluation of real–time synchronization in Real–Time Mach", 1991, pp. 213–221.

Abstract of conference paper, Reliable Software Technologies—Ada Europe, London, UK, F. Mueller, "Supporting Ada 95 passive partitions in a distributed environment", 1997, pp. 218–229.

Abstract of article, Real–Time Magazine, No. 2, W. Weinberg, "Meeting real–time performance goals with kernel threads", Apr.–Jun. 1997, pp. 51–54.

Abstract of article, Journal of KISS(A) (Computer Systems and Theory), v.25, No. 2, Young Phil Cheung et al., "ESR: an extension of SR language system for real–time synchronization using POSIX threads", Feb. 1998, pp. 124–135.

IBM Technical Disclosure Bulletin, vol. 38, No. 6, "Polling Method for Data Transmission in a Multitasking Operating System", Jun. 1995.

IBM Technical Disclosure Bulletin, vol. 34, No. 3, "PC at Simulator Printer Sharing with AIX", Aug. 1991.

IBM Technical Disclosure Bulletin, vol. 38, No. 5, "Deterministic Priority Inversion Method for Personal Computers", May 1995.

IBM Research Disclosure, No. 410115, "Using Different Tasking Schemes to Satisfy Requests for Two File Systems", Jun. 1998.

* cited by examiner

SYSTEM, METHOD, AND PROGRAM FOR IMPLEMENTING PRIORITY INHERITANCE IN AN OPERATING SYSTEM

BACKGROUND OF THE INVENTION

1. Field of the Invention

The present invention relates to a method, system, and program for implementing priority inheritance in an operating system to avoid priority inversion problems.

2. Description of the Related Art

The prior art Portable Operating System Interface (POSIX) standards define an interface between application programs and operating systems. Systems that utilize the POSIX standards include the prior art International Business Machines Corporation ("IBM") AIX operating system, most UNIX operating systems, Microsoft Corporation's WINDOWS® NT operating system, IBM's OS/2® operating system, and JAVA® systems. AIX and OS/2 are registered trademarks of IBM; UNIX is a registered trademark of the Open Group; WINDOWS is a registered trademark of Microsoft Corporation; and JAVA is a trademark of Sun Microsystems, Inc. In prior art POSIX compliant systems, a thread is an independent flow of control that operates within the same address space as other independent flows of controls. Multiple threads may be grouped into a single entity called a process. In a multiprocessor system, multiple threads can execute at the same time, one on each processor. There may be multiple processes executing, each including multiple threads.

A process provides a common address space and common system resources, including file descriptors, signal actions, shared libraries, and inter-process communication tools (such as message queues, pipes, semaphores, or shared memory). The thread is the schedulable entity. It has only those properties that are required to ensure its independent flow of control.

Processes and threads are managed by a kernel program. The kernel includes operating system primitives and contains programs for such tasks as input/output, management and control of hardware, the scheduling of user tasks, and frequently needed functions of the Base Operating System.

A user thread is an entity used by programmers to handle multiple flows of controls within a program. The API for handling user threads is provided by a library, the threads library. In the prior art IBM AIX operating system, and certain other operating systems, a user thread only exists within a process; a user thread in process A cannot reference a user thread in process B. The library uses a proprietary interface to handle kernel threads for executing user threads. The user threads API, unlike the kernel threads interface, is part of a portable programming model. Thus, a multi-threaded program developed on an AIX system can easily be ported to other systems.

A mutex is a mutual exclusion lock. To insure that two threads do not concurrently access the same shared resource, one thread holds the mutex lock, which prevents other threads from accessing the resource governed by the mutex. To access a memory area, a thread first accesses and locks the mutex, performs the read/write operation with respect to the shared resource, and then unlocks the mutex to allow other threads to access the resource. Threads are ranked according to a priority attribute. Higher priority threads have preferred access to CPU time over lower priority threads.

The situation of priority inversion occurs when a thread is holding a mutex and a higher priority thread attempts to access the resource governed by the mutex. In such case, the higher priority thread must wait for the lower priority thread to release the mutex. Because the higher priority thread must wait for the thread executing at the lower priority to release the mutex, the higher priority thread is effectively reduced to the lower priority while the lower priority thread holds the mutex.

Unbounded priority refers to a priority inversion situation where a medium priority thread is given priority to the processor cycles and prevents the low priority thread holding the mutex from completing its process and releasing the mutex to the high priority thread. In such case the high priority thread may be blocked indefinitely from obtaining the mutex by the medium priority thread, or at least until the medium access thread completes using the processor and allows the low priority thread to complete processing and release the mutex.

Two common solutions to priority inversion include priority inheritance and priority ceiling. With priority inheritance, the lower priority thread holding the mutex has its priority adjusted to the higher priority of the thread wanting access. When the lower priority thread executing at the higher priority releases the mutex, its priority is then restored to the lower priority. With the priority ceiling method, when a thread acquires a mutex, its priority is increased to a priority higher than any other thread that may acquire the mutex.

Although priority inheritance may appear straightforward in theory, it is often difficult to implement. For instance, in the prior art IBM AIX system and other operating systems, priority inheritance cannot be implemented between threads executing within different processes because a thread in one process cannot affect the priority of a thread in another process. Such systems can implement the priority ceiling method, because a given thread may adjust its own priority to the higher ceiling priority. However, the priority ceiling technique is sometimes inefficient because it may boost the priority of a thread accessing a mutex to an unnecessarily high priority, especially if other threads that subsequently want the mutex are at a priority that is lower than the thread currently accessing the mutex. This unnecessary boosting of threads can slow down overall system processing by providing more CPU cycles than needed to threads holding the mutex. In this respect, priority inheritance is preferred because it will not boost the priority of the thread currently holding the mutex higher than necessary to prevent priority inversion.

There is thus a need in the art to provide a method for implementing priority inheritance in operating systems. Further, there is a need in the art to provide priority inheritance for operating systems that do not allow threads to affect priority between processes.

SUMMARY OF THE PREFERRED EMBODIMENTS

One area where the inability to implement priority inheritance is problematic is in network printing systems. A file submitted to the printer often includes printer instructions in a page description language (PDL) such as POSTSCRIPT®. POSTSCRIPT is a registered trademark of Adobe Systems, Incorporated. The PostScript language is used by many printers and applications to provide the complex fonts, graphics, and image handling capabilities required by today's applications. The PostScript language must be interpreted by a transform process in the printer or elsewhere in the network to produce a print image file that is ready to be printed. Print image files are in a bit-mapped image format, also known as a raster image. A raster image processor (RIP) translates PDL files to a raster image or RIP version of the file. The term RIP is used herein to refer to any type of transform process regardless of the format of the file being transformed to a printer readable format, i.e., bitmap file. The terms RIP, RIPper, RIPped, and RIPping all refer to a particular stage or instance of a RIP transform process. In the desktop publishing environment, it can take several hours to transform a large PDL print file to its RIP version.

At the same time that a thread is RIPping a print image to a bit-mapped image, another thread, referred to as a print mechanism, is executing to transfer bit-mapped images to the printer to print. The printer requests pages to print from the print mechanism, and the print mechanism accesses a queue of RIPped pages to transfer to the printer. The print mechanism executes within a different process than the RIPper thread. Further, the print mechanism operates at a much higher priority than the RIPper thread.

The print mechanism requires a high priority because the print mechanism responds to requests from the print engine that if not immediately addressed could result in the printer shutting down. For instance, the print engine may send the print mechanism a message indicating the printer is out of paper, toner, paper jammed, etc. A case of priority inversion can occur between the low priority RIPper and the high priority print mechanism if the RIPper holds the mutex for a print queue that the print mechanism needs to access to return RIPped pages to the printer. If the print mechanism is waiting for a lower priority thread to release a mutex, then the print mechanism will not be able to respond to the critical print engine message and address the problem to prevent the printer from shutting down.

Because the RIPper and print mechanism threads execute in different processes, in certain systems, such as AIX, that do not permit priority inheritance between processes, less efficient methods such as priority ceilings are the only option to prevent priority inversion.

To overcome the limitations in the prior art described above, preferred embodiments disclose a system, method, and program for implementing priority inheritance in an operating system. A first list includes a boost request to boost a priority of an indicated thread holding a shared resource to an indicated priority. Further included is a second list. The system processes the boost request in the first list to boost the priority of the indicated thread to the indicated priority. After boosting priority, the system removes the processed boost request from the first list and places the processed boost request in the second list.

In further embodiments, the first and second lists are capable of including multiple boost requests for the same indicated thread for each shared resource held by the indicated thread. The system processes a submitted boost request to boost an indicated thread to an indicated priority as follows. If the submitted boost request is higher than both (a) the current priority of the indicated thread and (b) an indicated priority of a pending boost request in the first list for the indicated thread, then the submitted boost request is queued in the first list. Otherwise, the submitted boost request is queued in the second list.

In still further embodiments, the first list queues boost requests for all threads executing within a process and the second list queues all boost requests for a specific thread executing within the process.

Preferred embodiments provide one or more lists of boost requests toward threads operating in a process to boost the priority of threads executing in the process that are currently holding a mutex or other shared resource. Boost requests may be added to the queue to boost the priority of the holding thread by threads seeking access that are executing in the same or different process in which the holding thread is executing. Preferred embodiments provide a mechanism to allow threads in the same or different process as the holding thread to affect the priority of the holding thread in a logical and orderly manner to insure that priority inversion does not occur. Preferred embodiments further provide a priority inheritance mechanism that insures that threads holding a mutex do not execute at a priority higher than necessary, i.e., not higher than the priority of the highest priority thread attempting to access the held mutex.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
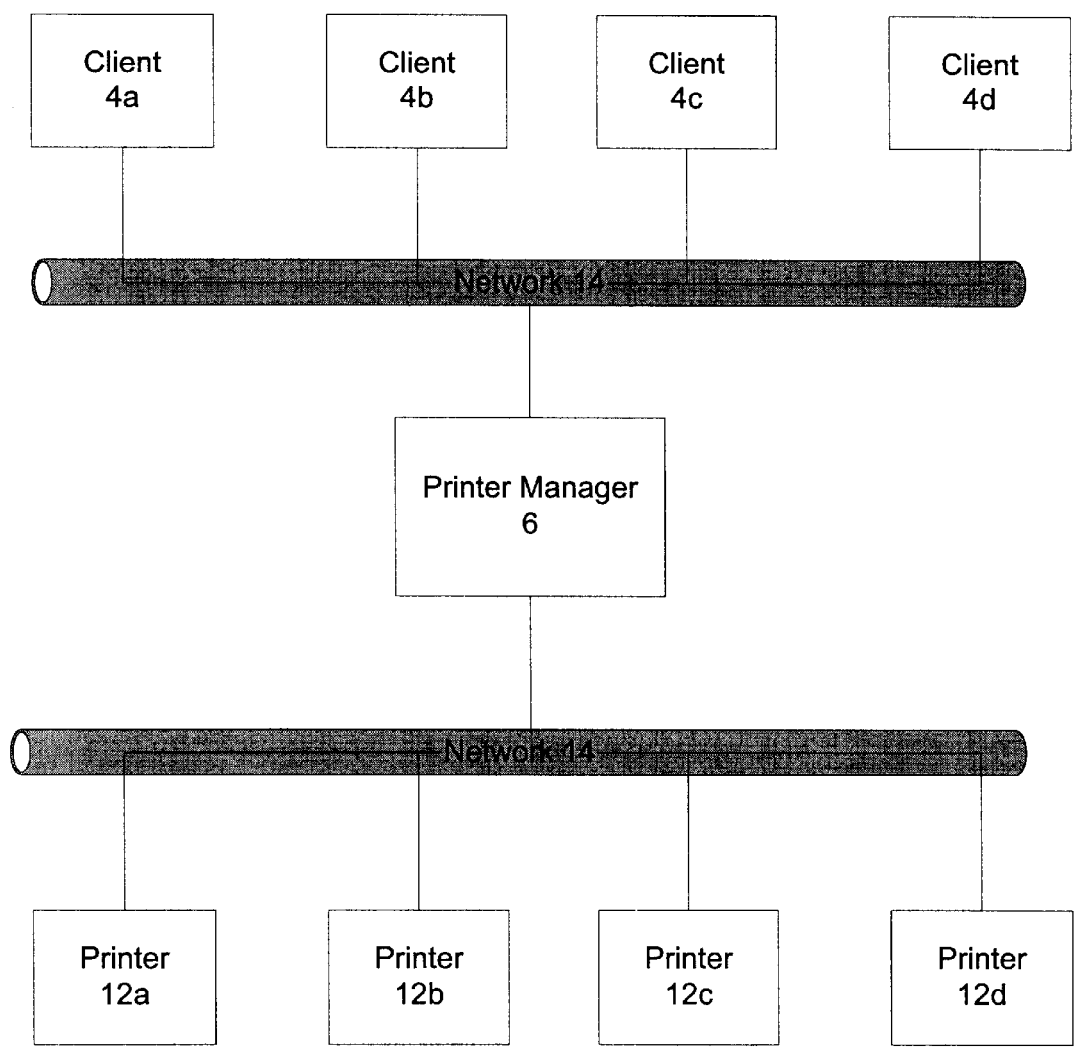
FIG. 1 is a block diagram illustrating a software and hardware environment in which preferred embodiments of the present invention are implemented.

FIG. 1 illustrates a computing environment in which preferred embodiments are implemented. A network printing system 2 is comprised of a plurality of client computers 4a, b, c, d connected to a printer manager 6, otherwise known as a server, which routes print jobs received from the clients 4a, b, c to one of a plurality of printers 12a, b, c, d. The printers 12a, b, c, d may be any suitable printer machine known in the art, such as the IBM INFOPRINT™ series of printers. INFOPRINT is a trademark of IBM. The printer manager 6 may be a separate stand alone server including an operating system such as AIX, OS/390™, UNIX, OS/2, MVS™, WINDOWS, etc. OS/390 and MVS are trademarks of IBM. The clients 4a, b, c, d may be any computer system known in the art including software to submit print jobs to the printer manager 6.

The clients 4a, b, c, d may build print jobs that include print files, such as PostScript files, and transmit the print files to the printer manager 6. The printer manager 6 maintains a queue of submitted print jobs, i.e., spools the print jobs. Once submitted, the printer manager 6 can RIP the print job itself or route the print job to a printer 12a, b, c, d to RIP the print job.

A network system 14 links the clients 4a, b, c, d to the printer manager 6, and the printer manager 6 to the printers 12a, b, c, d. The network 14 may be comprised of any suitable network architecture known in the art, such as LAN, SNA, Ethernet, WAN, System Area Network (SAN), Token Ring, LocalTalk, TCP/IP, the Internet, etc. Alternatively, there may be separate and different networks between the clients 4a, b, c, d, the printer manager 6, and the printers 12a, b, c, d. Network printing systems are embodied in current IBM Multiple Printer Controller (MPC) and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety.

Operating System Thread Management

Figure 2:
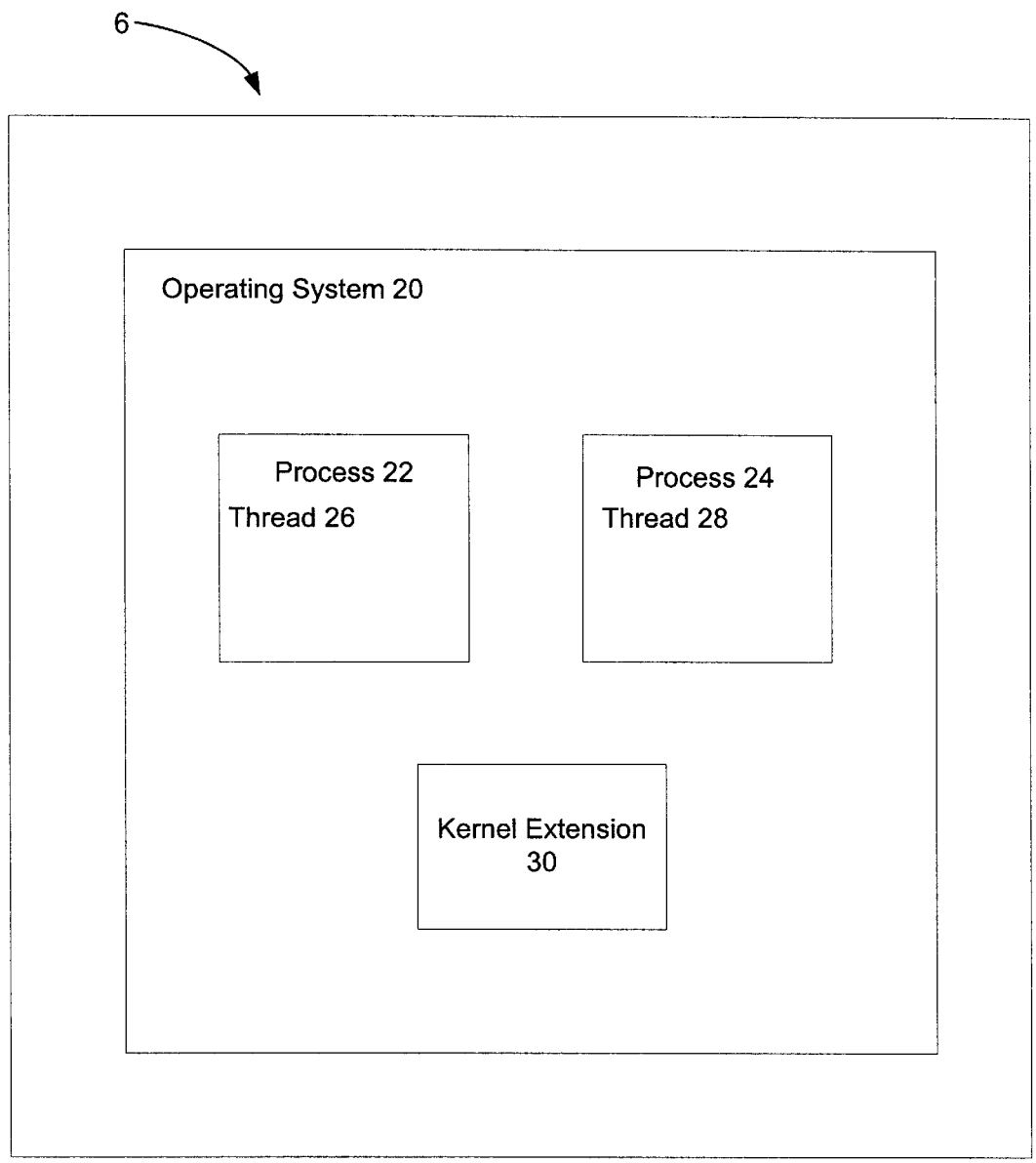
FIG. 2 is a block diagram illustrating an operating system environment in which preferred embodiments of the present invention are implemented.

FIG. 2 illustrates further detail of an operating system 20 executing within the printer manager 6. Within the operating system 20, there are two processes 22 and 24 simultaneously executing. Within each process, there are separate user threads 26 and 28 executing. In the current version of AIX, version 4.2, a user thread in one process cannot reference a user thread in another process. A kernel extension 30 provides additional kernel services and a library of routines in which the preferred priority inheritance methods are implemented to allow a thread 26 executing in one process 22 to affect the priority of a thread 24 executing in another process 28. The kernel extension 30 implements mutexes, messaging queues, memory pools and conditional variables. When a thread accesses a queue or creates a mutex, the kernel extension 30 creates a node to track a request for the mutex. The kernel extension 30 maintains a record of each process and all threads in the process. This thread record includes a field indicating a base priority of the thread and a thread ID. With preferred embodiments, a thread's current priority at which the thread is executing may be higher than its base priority if its priority is boosted.

Boosting a thread temporarily for priority inheritance purposes will not alter the base priority for the thread, which indicates the priority associated with the application that initiated the thread. However, the base priority may be altered by a specific call to alter the base priority. Threads with higher priority are processed in advance of threads with lower priority. The kernel 30 extension further maintains information, for each mutex, on all thread requests for the mutex while the mutex was held by another thread. Further details of kernel extensions are described in IBM publications "AIX Version 4.3 Kernel Extensions and Device Support Programming Concepts," IBM publication no. SC23-4125 (IBM copyright, 1997) and "AIX Version 4.3 Kernel and Subsystems Technical Reference, Volumes 1 and 2," IBM publication nos. SC23-4163 and SC23-4164 (IBM copyright, 1997), which publications are incorporated herein by reference.

Figure 3A:
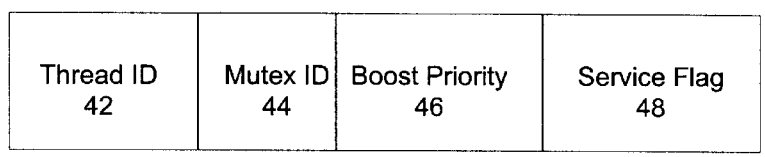
FIGS. 3a, b are block diagrams of a boost request data structure and lists for queuing boost requests in accordance with preferred embodiments of the present invention.

FIGS. 3a, b illustrate lists, queues and data structures the kernel extension 30 maintains to manage requests to boost the priority of threads 26, 28 executing within processes 22, 24. These data structures, lists, and queues allow a thread executing in one process to execute routines provided by the kernel extension 30 to boost the priority of threads executing in another process. To boost the priority of a thread currently holding a shared resource, e.g., a mutex, a thread makes a call to a kernel extension 30 routine to create a boost request data structure, shown as 40 in FIG. 3a. This boost request 40 includes a thread field 42 indicating the thread ID and process ID of the thread to boost, a mutex ID field 46 indicating the mutex ID held by the thread to which the boost request applies. A boost request applies to a thread/mutex pair, defining a holding thread and the held mutex. The boost request 40 further includes a boost priority field 46 indicating the priority to boost the thread indicated in thread field 42, and a service flag 48 indicating whether the boost request has been satisfied. In preferred embodiments, only one boost request 40 is maintained for a given thread/mutex pair at any one time.

Figure 3B:
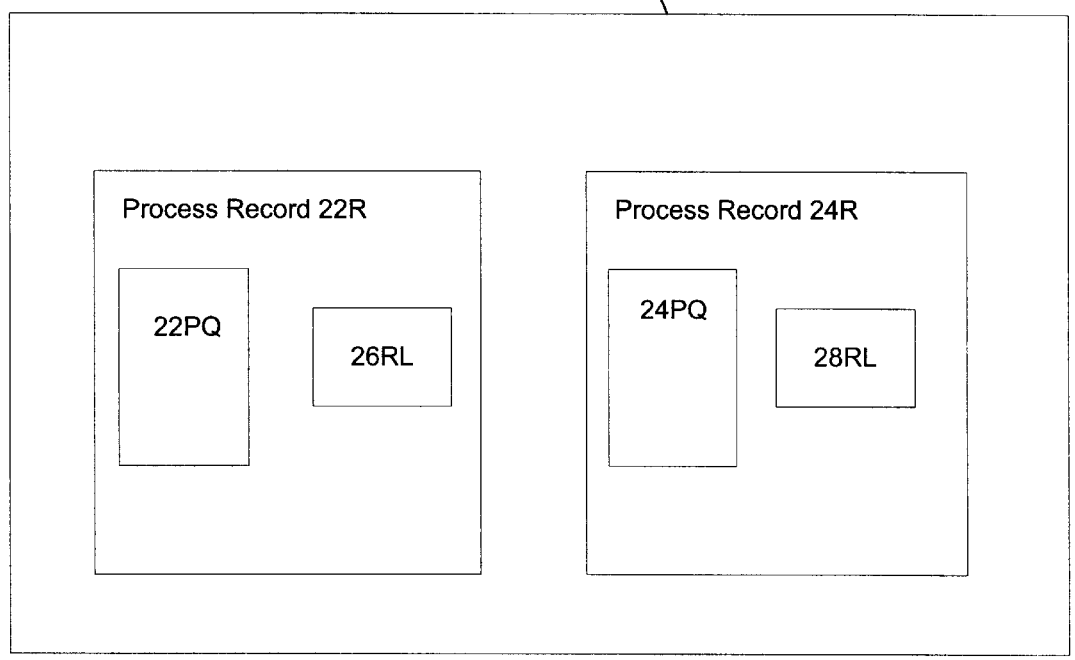

With respect to FIG. 3b, the kernel extension 30 maintains a process record 22R and 24R for each process 22, 24, respectively, executing in the operating system 20. For each process 22, 24, the kernel extension 30 maintains a pending queue 22PQ, 24PQ, respectively, of boost requests for all threads within the respective process. The kernel extension 30 also maintains a restore list 26RL, 28RL for each thread holding a mutex, that includes boost requests that already have been serviced for that thread. Thus, if thread 26 or 28 held a mutex, there would be a corresponding restore list 26RL, 28RL maintained in the process record 22R, 24R for the threads 26, 28 holding the mutex. A pending queue 22PQ, 24PQ maintains, for a process 22, 24, respectively, all queued boost requests for threads 26, 28 executing in such processes 22, 24. In preferred embodiments, the pending queue 24PQ, 26PQ only maintains the highest priority boost request for a thread. Any lower priority unserviced boost requests for the thread are moved to the restore list 26RL, 28RL when adding a higher priority boost request for the thread to the pending queue. A releasing thread can set the priority for a thread to the highest priority unserviced boost request in the restore list, which would be the highest priority of a thread requesting access after the releasing thread. In this way, priority may be lowered to the next highest priority thread seeking access after the releasing thread releases the mutex. This insures that the holding thread does not run at a priority higher than that of the highest priority thread that seeks access to the mutex.

In preferred embodiments, the first time a thread within a process seeks to access a shared resource, e.g., a mutex, the kernel extension 30 creates a high priority kernel thread, referred to as a "booster thread," to process boost requests in the pending queue 22PQ, 24PQ for that process 22, 24. The kernel extension 30 booster thread for a process receives an interrupt when a boost request 40 is queued in the pending queue managed by that booster thread. Upon, receiving the interrupt, the booster thread wakes up and accesses a boost request 40 from the pending queue and boosts the priority as indicated in the boost request, sets the service flag 48 to "TRUE," and then places the serviced boost request in the restore list for the thread that just had its priority boosted.

These restore list and pending queue data structures allow threads executing in one process to affect the priority of threads executing in another process. Whenever a thread in any process requests a mutex that is currently held by a lower priority thread, whether the requesting thread is within the process of the thread holding the mutex or another process, the kernel extension 30 would process that request by generating a boost request or recycling a previously processed boost request and then queue such request on the pending queue or the restore list according to the logic of FIGS. 4–10.

FIGS. 4–10 illustrates logic implemented within calls and routines in a library of the kernel extension 30 to manage requests for shared resources, such as mutexes, and to allow priority inheritance between threads executing in different processes. The calls described in FIGS. 4–10 would be executed by a thread releasing control of a mutex, referred to as a releasing thread, a thread requesting access to a mutex, referred to as a calling thread, or a booster thread processing boost requests in the pending queue. The preferred logic is described with respect to priority inheritance for mutexes. However, the preferred logic could apply to controlling access to any shared resource, including messaging queues, conditional variables, memory pools, etc. The preferred logic insures that priority inversion will not occur and that a thread holding a mutex, referred to as the "holding thread," will not execute at a lower priority than any of the threads which have requested the held mutex.

Figure 4:
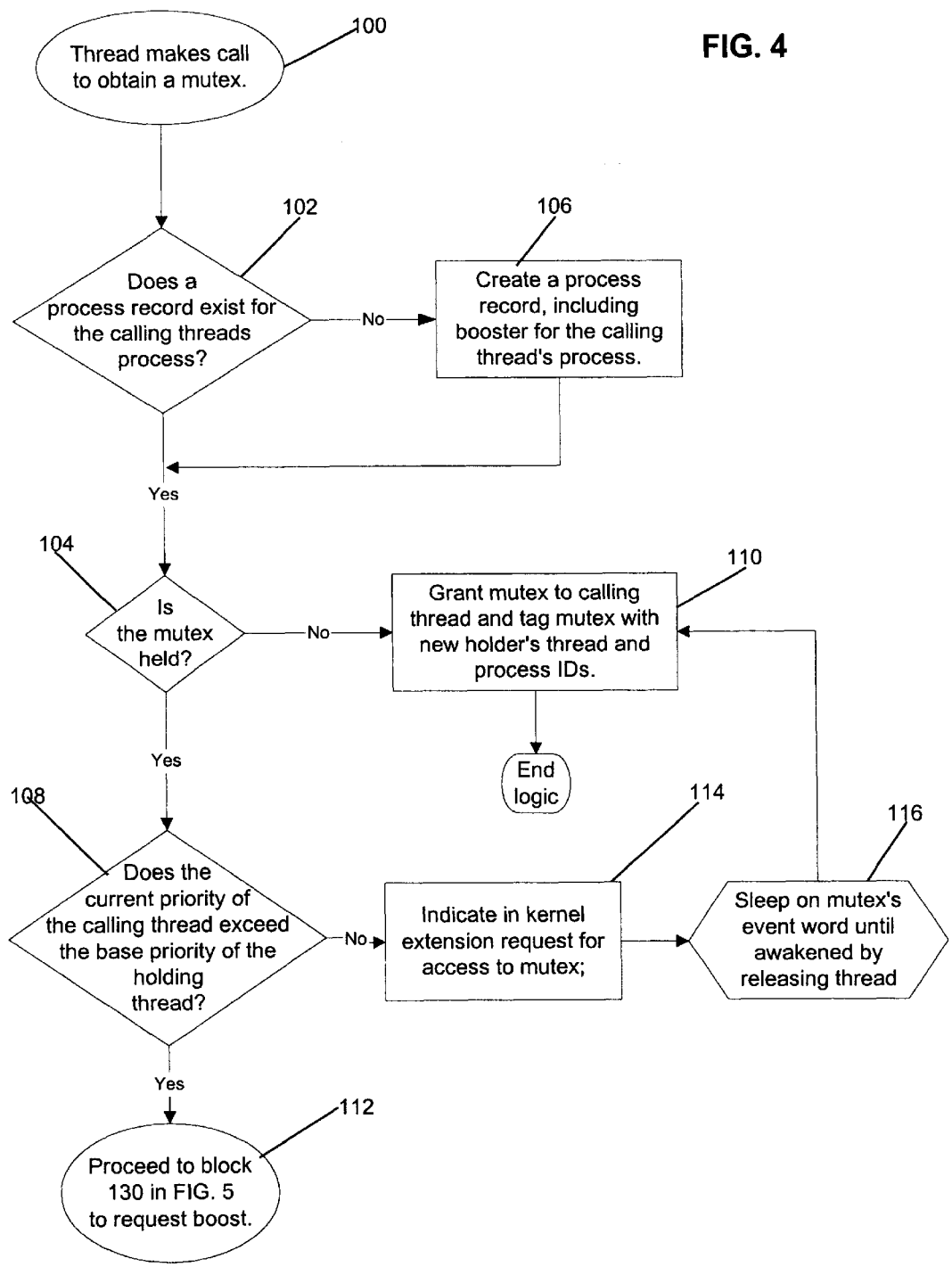
FIG. 4 illustrates logic implemented within the operating system to process a call to a mutex in accordance with preferred embodiments of the present invention.

FIG. 4 illustrates logic implemented in a routine in the kernel extension 30 library that a calling thread executes to access a mutex. A thread, e.g., the calling thread 28, executes a call (at block 100) to access a mutex. The calling thread determines (at block 102) whether a process record exists for the process in which the calling thread is executing. If not, then the calling thread calls a routine to have the kernel extension 30 create a process record (at block 106) for the process and a high priority booster thread for the calling thread's process. After the process record and booster thread exist (at blocks 102 or 106), the calling thread then determines (at block 104) whether the requested mutex is held. As discussed, for each mutex, the kernel extension 30 maintains an index of the thread and process IDs for the thread that holds the mutex. If the mutex is not held by another thread, then the calling thread obtains control (at block 110) over the mutex and indicates in the mutex index the new holder's thread and process IDs. If the mutex is held by another thread, then the calling thread determines (at block 108) whether the current priority of the calling thread exceeds the base priority of the holding thread. If the current priority of the calling thread exceeds the base priority of the holding thread, then the calling thread proceeds to block 130 in FIG. 5 to call a routine to request a boost to the priority of the thread holding the mutex to prevent priority inversion. Otherwise, the calling thread indicates (at block 114) in a request list within the kernel extension 30 the request for the mutex. The booster thread for the held mutex sleeps (at block 116) on the mutex's event word until awakened by a thread releasing the mutex. Upon awakening, the booster thread would process the list of requests for the released mutex, and proceed to grant the mutex (at block 110) to a thread on the request list which previously requested the mutex. The priority does not need to be adjusted if the calling thread has a lower priority than the holding thread because the holding thread is executing at the highest priority of the holding thread and threads that seek the mutex.

Figure 5:
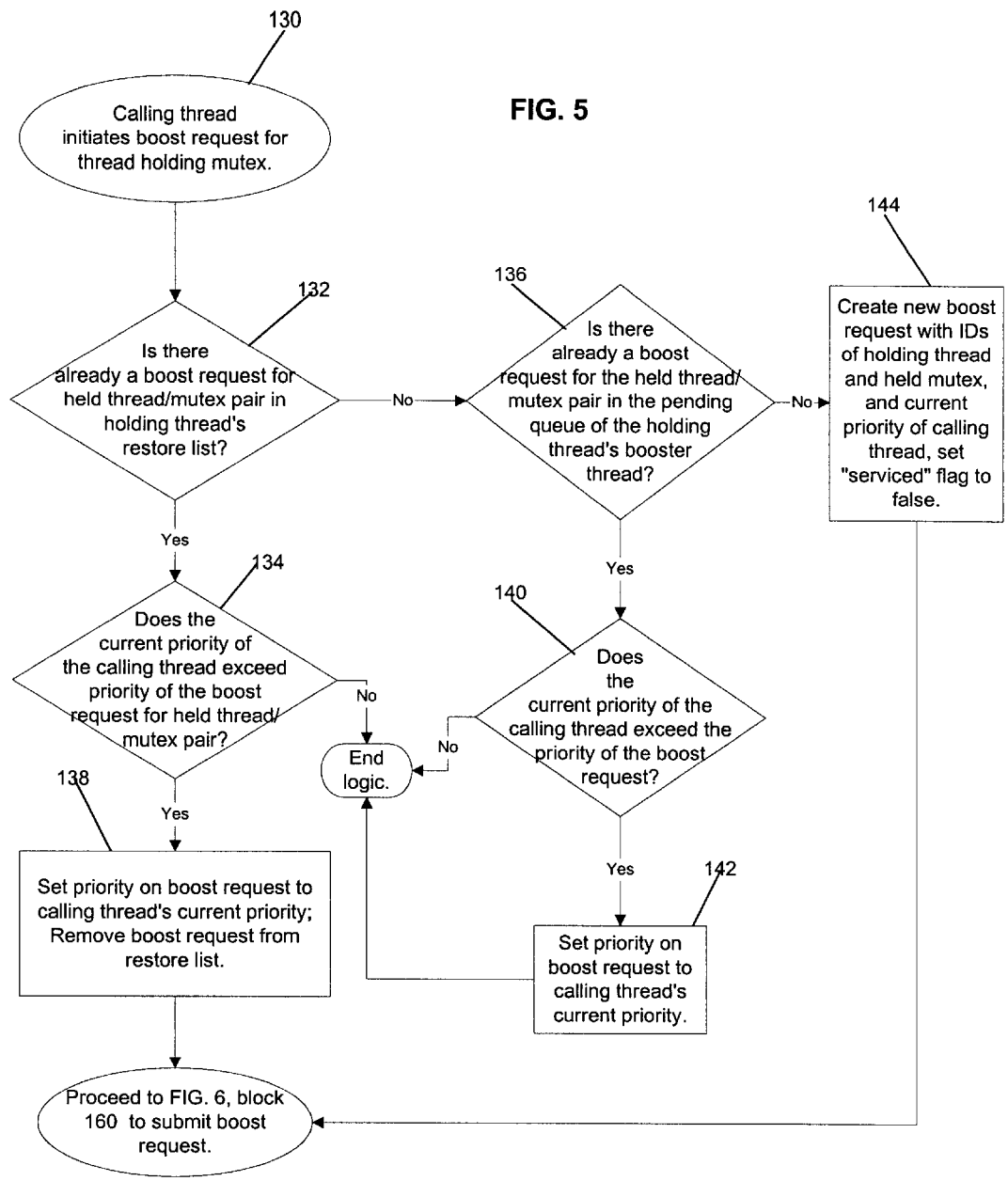
FIG. 5 illustrates logic implemented within the operating system to initiate a boost request in accordance with preferred embodiments of the present invention.

FIG. 5 illustrates logic to initiate a boost request to a thread holding the mutex from the calling thread seeking to obtain the mutex (at block 100). A boost request may be generated or created from recycling a boost request in one of the queues. Upon determining that the calling thread has a higher priority than the base priority of the thread holding the mutex, the calling thread initiates a boost request call. The calling thread determines (at block 132) whether there is already a boost request 40 for the holding thread and held mutex, referred to as a "held thread/mutex pair," in the holding thread's restore list. If there is already a boost request in the restore list, then the priority of the holding thread was previously boosted and the calling thread determines (at block 134) whether the current priority of the calling thread exceeds the priority of the located boost request in the restore list for the held thread/mutex pair. If the calling thread's priority is greater, then the calling thread (at block 138) sets the boost priority field 46 of the boost request 40 for the thread/mutex pair to the calling thread's priority. The calling thread then removes the boost request from the restore list and proceeds to block 160 in FIG. 6 to submit the altered boost request. In this way, the boost request is recycled from the restore list back to the pending queue to be used to again boost the priority to the higher priority of the calling thread. If the calling thread's priority is less than the priority indicated in the boost priority field 44 (at block 134) for the boost request for the held thread/mutex pair, then the logic terminates as there is no priority inversion if the calling thread already has a lower priority.

If the calling thread determined (at block 132) that there is no boost request for the held thread/mutex pair in the restore list, then the calling thread determines (at block 136) whether there is a boost request for the held thread/mutex pair in the pending queue for the process in which the holding thread is executing. If so, then the calling thread determines (at block 140) whether the current priority of the calling thread exceeds the priority of the boost request already in the pending queue, as indicated in the boost priority 46 field. If the calling thread's current priority is higher, then the calling thread modifies (at block 142) the priority in the boost priority field 46 of the pending boost request to the calling thread's current priority. Otherwise, if the calling thread's priority is lower (at block 140), then the logic ends with no change to the queued boost request for the held thread/mutex pair. If the calling thread determined (at block 136) that there is no boost request for the held thread/mutex pair in the pending queue, then the calling thread would create (at block 144) a new boost request 40 by setting: the thread ID field 40 to the ID of the thread holding the mutex, the mutex ID field 44 to the requested mutex ID, the boost priority field 46 to the calling thread's current priority, and the service flag field 48 to FALSE. The kernel calling thread would then proceed to block 160 in FIG. 6 to submit the new boost request.

Figure 6:
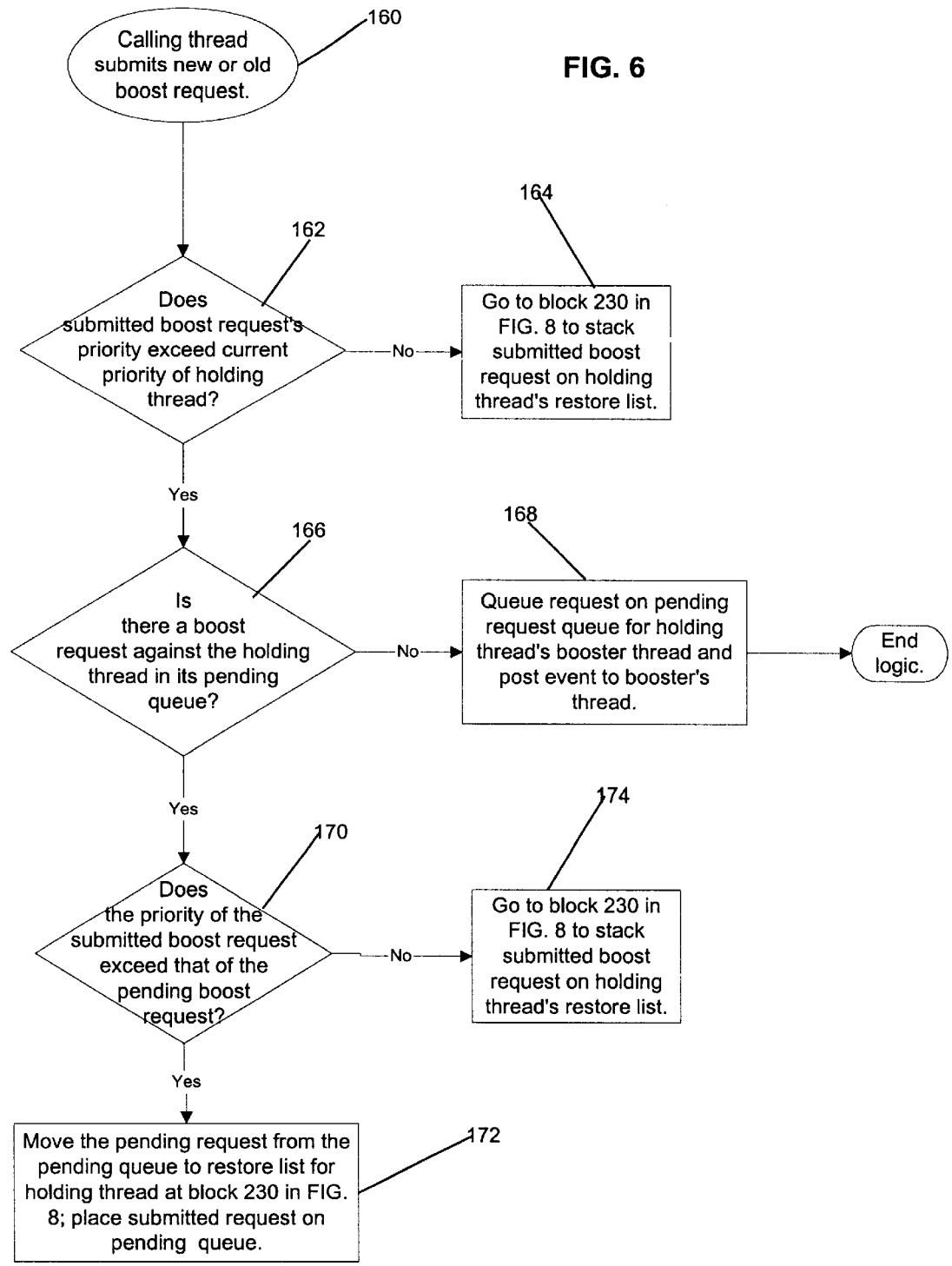
FIG. 6 illustrates logic implemented within the operating system to submit a boost request in accordance with preferred embodiments of the present invention.

In this way, with the logic of FIG. 5, if the calling thread has a higher priority than any pending boost request, in either queue, the pending boost requests are modified to the higher priority of the calling thread. Otherwise, if there are no pending boost requests for the thread/mutex pair, a new boost request is created to boost to the higher priority calling thread. In all cases, a boost is made to the higher priority of the calling thread or holding thread, to avoid priority inversion. FIG. 6 illustrates logic implemented in a kernel extension 30 routine to determine on which queue, i.e., the restore list or pending queue, to place the modified or new boost request.

With respect to FIG. 6, the calling thread executes a call to submit a new or modified boost request from the routine implementing the logic of FIG. 5. The calling thread then determines (at block 162) whether the submitted boost request's priority, indicated in the boost priority field 46, exceeds the current priority of the holding thread. If the submitted boost request's priority does not exceed the current priority of the holding thread (at block 162), then the calling thread proceeds (at block 164) to block 230 in FIG. 8 to stack the submitted boost request on the holding thread's restore list. This will avoid the booster thread processing the lower priority boost request in the pending queue. Otherwise, if the submitted boost request has a higher priority than the holding thread's current priority, then the calling thread determines (at block 166) whether there is a boost request to boost the priority of the holding thread queued in the pending queue. Such another boost request would be for another mutex that the thread holds. If there is no queued boost request against the holding thread for another mutex in the pending queue, then the calling thread (at block 168) queues the boost request on the pending queue managed by the holding thread's booster thread, and posts an event to the booster thread to wake the booster thread to process boost requests in the pending queue.

Otherwise, if there is a boost requests for the holding thread in the pending queue (at block 166), then the calling thread (at block 170) determines whether the priority of the submitted boost request exceeds that of the pending boost request, as indicated in the boost priority fields. This pending boost request is for the same thread, but a different mutex. If the submitted boost request has higher priority, then the calling thread (at block 172), moves the pending request from the pending queue to the restore list for the holding thread and places the submitted boost request in the pending queue. The calling thread places the boost request on the restore list with a call to the logic beginning at block 230 in FIG. 8. This insures that only the highest priority boost request is maintained in the pending queue for a thread across all mutexes that the thread holds. Moreover, the lower priority request is moved to the restore list and may later be processed to lower priority when the thread of the submitted boost request releases the mutex. Otherwise, if the priority of the submitted boost request is less than the pending boost request for the holding thread in the pending queue, then the kernel extension (at block 174) proceeds to block 230 in FIG. 8 to stack the submitted boost request on the holding thread's restore list to be processed later once the thread releases the mutex associated with the higher priority boost request in the pending queue.

With the logic of FIG. 6, only the highest priority boost request for a thread, across all mutexes for which there are boost requests, is maintained on the pending queue. Boost requests to a lower priority for different mutexes are placed on the restore list. Once the highest priority thread releases the mutex, priority for the thread may be altered to the lower priority of an unserviced boost request on the restore list to lower the priority of the thread to the new highest priority. By lowering the priority to the priority of the next highest, after the highest priority thread releases access, the logic insures that a thread is not running at a priority higher than that of the thread currently holding or requesting the mutex. This optimizes priority inheritance and conserves processor cycles by insuring that threads are not set to unnecessarily high priorities.

Figure 7:
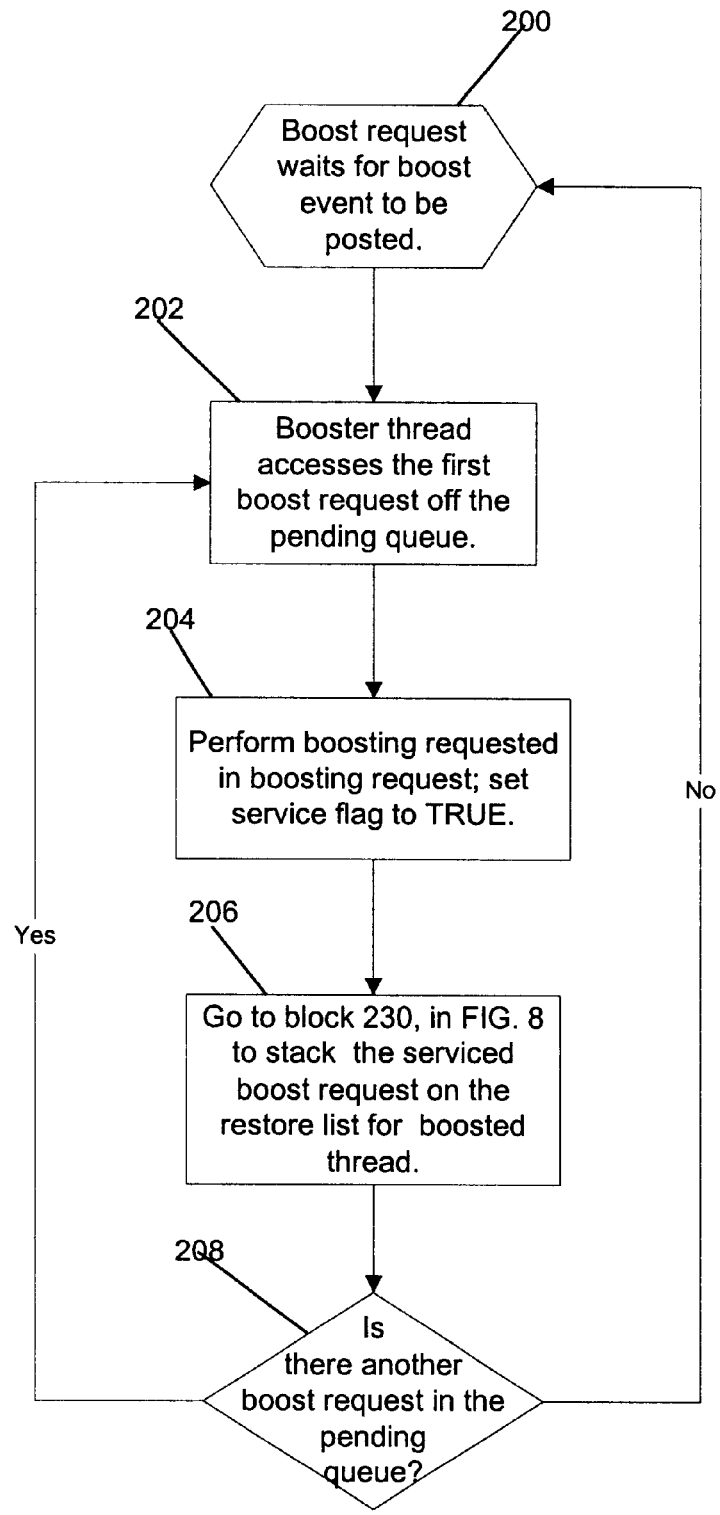
FIG. 7 illustrates logic implemented within the operating system to process a boost event in accordance with preferred embodiments of the present invention.

FIG. 7 illustrates logic implemented in a kernel extension library routine by a booster thread when the booster thread is awakened by a boost request being placed on the pending queue, such as the events posted at block 168 in FIG. 6. At block 200, the booster thread waits for the posting of a boost event, which occurs after a boost request is placed in the pending queue managed by the booster thread. Upon the posting of such event, the booster thread accesses (at block 202) the first boost request off the pending queue that the booster thread manages. The booster thread (at block 204) then executes a call to set the current priority of the thread indicated in the thread ID field 42 of the accessed boost request to the priority indicated in the boost priority field 46 of the accessed boost request and sets the service flag field 48 for the accessed boost request to TRUE, indicating that the boost request has been serviced. The booster thread then proceeds to block 230 in FIG. 8 to stack the serviced boost request on the restore list for the thread just boosted. The booster thread (at block 208) then determines whether there is another boost request on the pending queue. If so, the booster thread proceeds to block 202 to access the next boost request on the pending queue. Otherwise, the booster thread proceeds back to block 200 to wait for a subsequent posting of a boost event to the pending queue managed by the booster thread.

Figure 8:
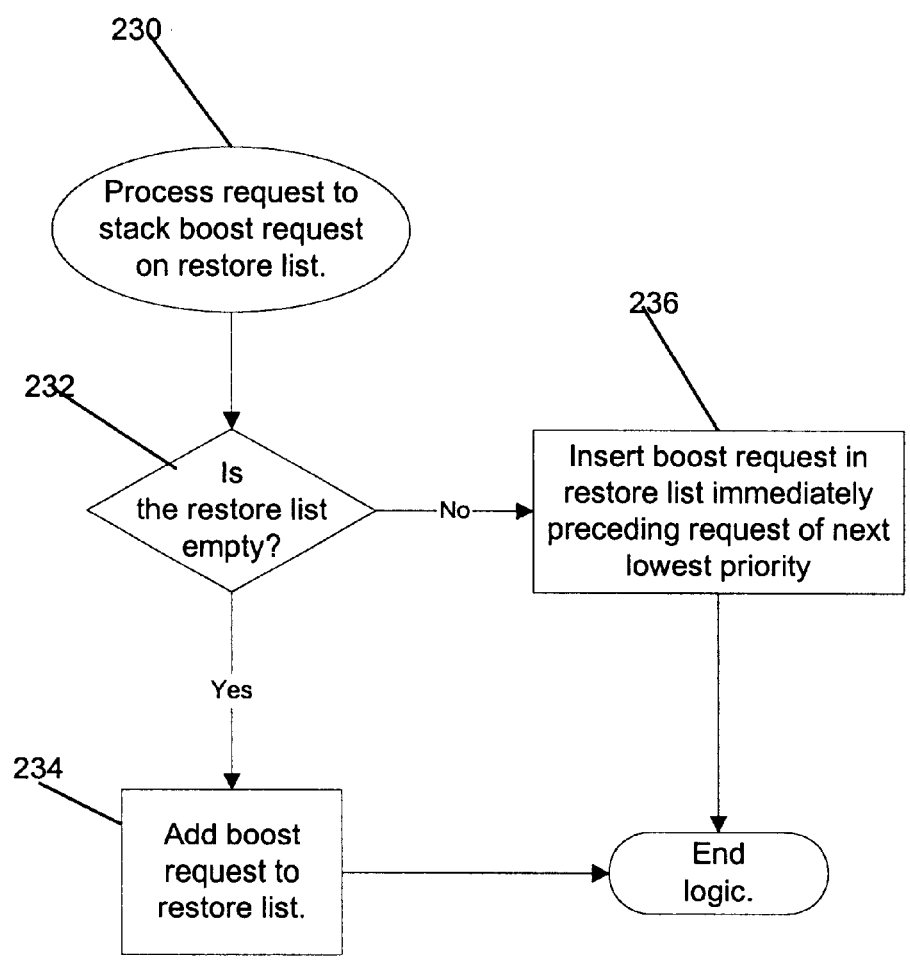
FIG. 8 illustrates logic implemented within the operating system to stack a boost request on a restore list in accordance with preferred embodiments of the present invention.

FIG. 8 illustrates logic implemented in a kernel extension 30 library routine that is executed by the releasing thread, calling thread or booster thread to place a boost request on the restore list. At block 230, a thread executes a call to stack the boost request on the restore list for the thread indicated in the thread ID field 42 of the serviced boost request. The thread determines (at block 232) whether the restore list for the boosted thread is empty. If so, then the thread (at block 234) adds the serviced boost request to the restore list. Otherwise, the thread inserts (at block 236) the boost request in the restore list immediately preceding the boost request having the next lowest boost priority.

Figure 9:
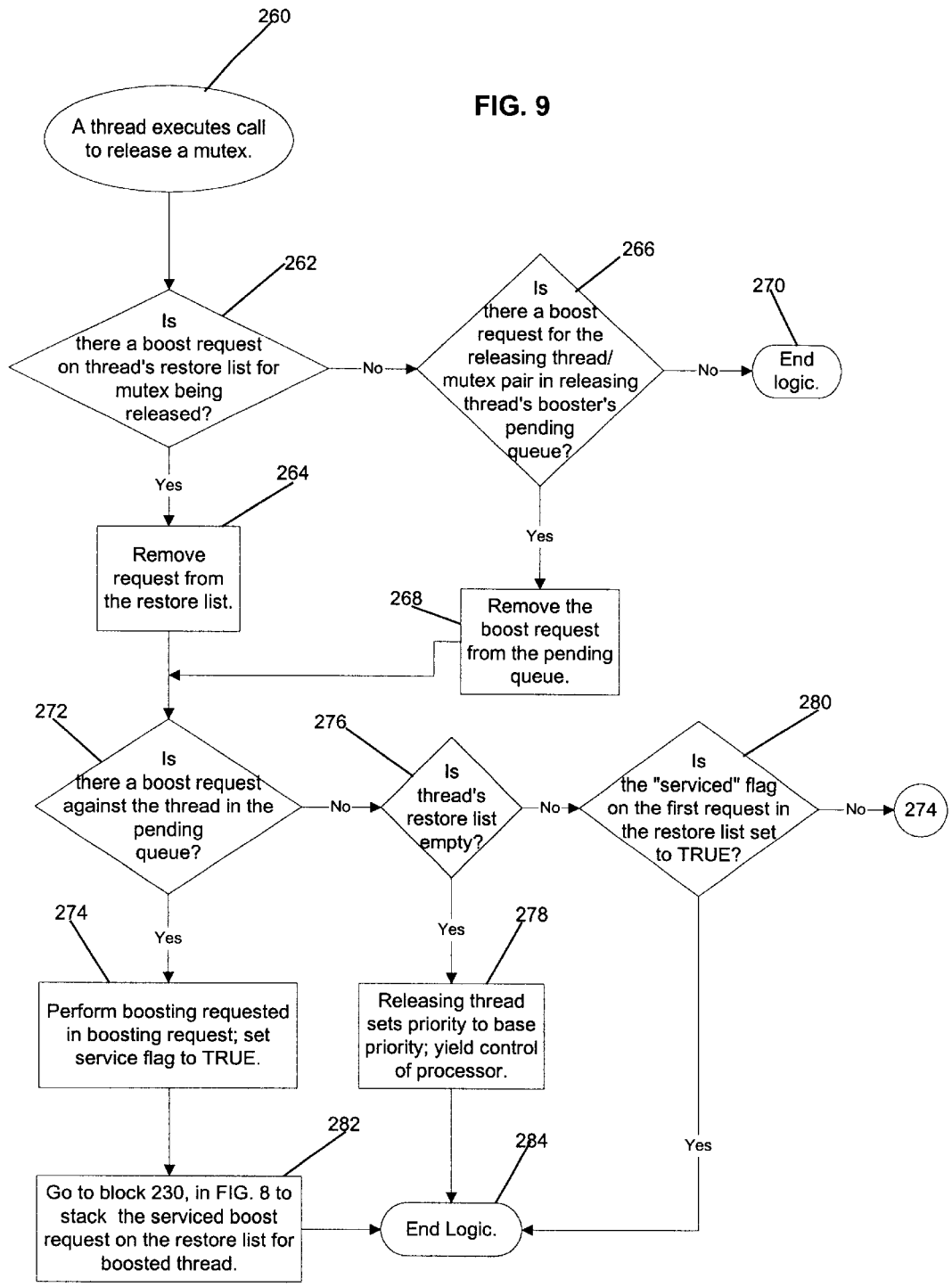
FIG. 9 illustrates logic implemented within the operating system to release a mutex in accordance with preferred embodiments of the present invention.

FIG. 9 illustrates logic implemented in a kernel extension 30 library routine by a thread releasing a mutex, i.e., a releasing thread. In preferred embodiments, a thread releasing a mutex removes any boost request for that releasing thread/mutex pair from the restore list or pending queue. Further, the priority may be boosted to a lower priority if there are other boost requests in the pending queue for the releasing thread and different mutexes than the released mutex or if an unserviced boost request is in the restore list. In this way, priority is lowered to the next highest priority of threads waiting to access the mutex level to conserve processor cycles. At block 260, the releasing thread executes the routine to release the mutex. The releasing thread determines (at block 262) whether there is a boost request in the releasing thread's restore list for the released mutex being released. If so, then the releasing thread removes (at block 264) that boost request from the restore list for the releasing thread. Otherwise, if there is not a boost request in the restore list, then the releasing thread determines (at block 266) whether there is a boost request for the releasing thread/mutex pair in the pending queue for the releasing thread. If there is a boost request in the pending queue, then the releasing thread removes (at block 268) the boost request from the pending queue and proceeds to check the pending queue (at block 272) for any boost requests for the releasing thread for mutexes other than the released mutex. Otherwise, if there is no boost request for the releasing thread/mutex pair in the pending queue and restore list, the logic ends at block 270.

If the releasing thread removed the boost request for the releasing thread/mutex pair (at block 264) or removed the boost request for the releasing thread/mutex pair from the pending queue (at block 268), then the releasing thread would determine (at block 272) whether there is a boost request for the releasing thread in the pending queue. Such a boost request in the pending queue would be for a different mutex than the mutex being released by the releasing thread. If there is a boost request in the pending queue for the releasing thread, then the releasing thread would make a call (at block 274) to boost its priority to the priority indicated in the boost priority field 46 in the boost request in the pending queue, and set the service flag field 48 in the boost request to TRUE. If there is not a boost request in the pending queue for the releasing thread, for a different mutex, then the releasing thread would determine (at block 276) whether the releasing thread's restore list is empty. If so, then the releasing thread would set its priority (at block 278) to its base priority and yield control of the processor to free-up processor cycles for other threads. Control ends after setting the priority to the base priority (at block 284). Otherwise, if the restore list is not empty, then the releasing thread would determine (at block 280) whether the service flag field 48 in the first boost request in the restore list for the releasing thread is TRUE. If so, the logic ends at block 284. Otherwise, if the service flag is set to FALSE, i.e., the boost request has not been serviced, then the releasing thread proceeds to block 274 to boost its priority to the priority indicated in the boost priority field 46 in the first boost request on the restore list. After boosting its own priority, logic proceeds to block 230 in FIG. 8 to stack the serviced boost request on the restore list for the boosted thread.

Figure 10:
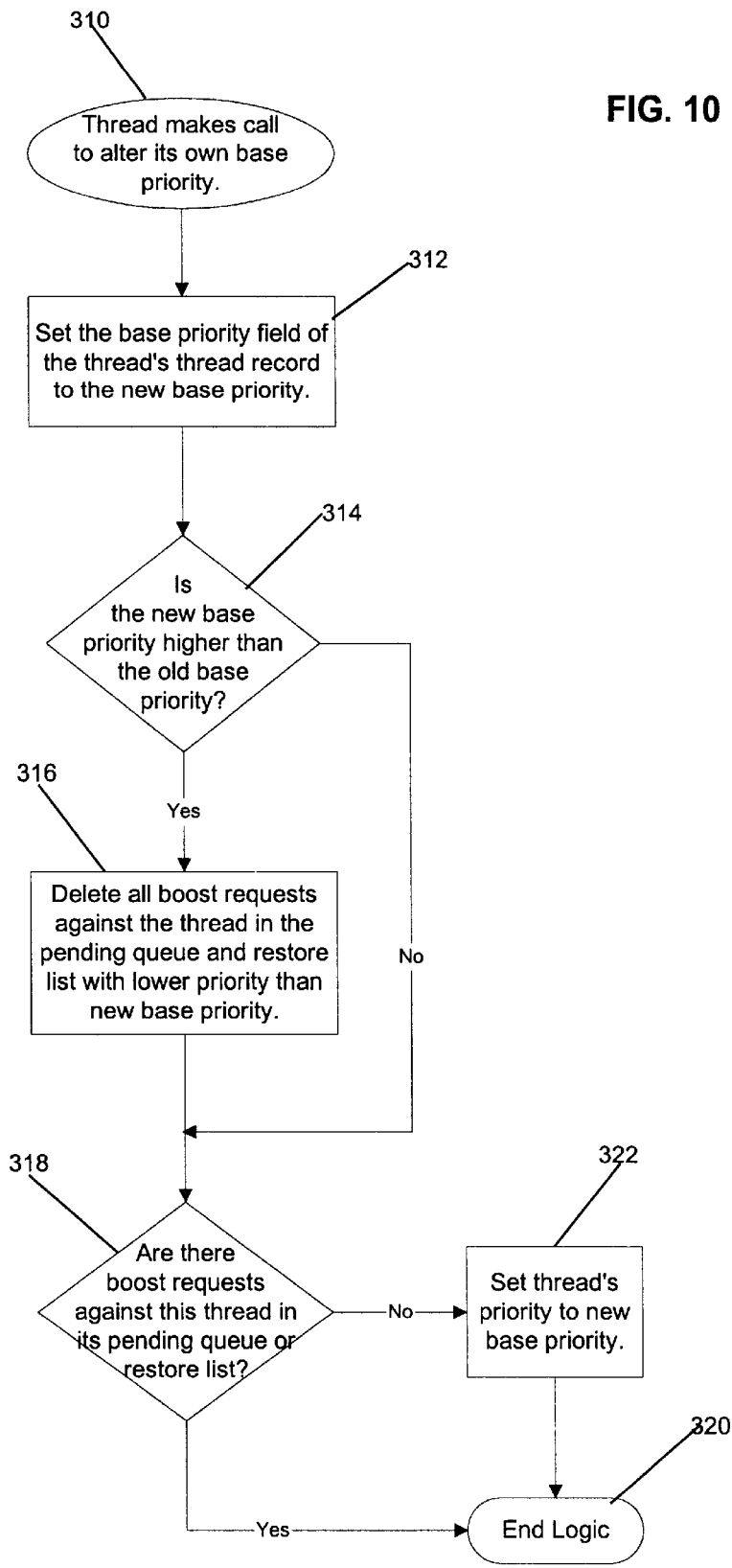
FIG. 10 illustrates logic implemented within the operating system for a thread to alter its own priority in accordance with preferred embodiments of the present invention.

FIG. 10 illustrates logic implemented in kernel extension 30 library routine and executed by a thread that is altering its own base priority. This may occur if the process the thread is performing increases or decreases in importance or priority. If there are queued boost requests having a lower boost priority than the new base priority, then the logic of FIG. 10 removes such lower priority boost requests from the queues to prevent the thread's current executing priority from being set to a priority lower than the new base priority. At block 310, a thread makes a call to alter its own base priority. The thread then sets (at block 312) the base priority field in the thread record to the new base priority. The thread then determines (at block 314) whether the new base priority is higher than the previous base priority. If so, the thread deletes (at block 316) all boost request against the thread, for all thread/mutex pairs, in the pending queue and restore list whose boost priority, indicated in the boost priority field 46, is lower than the new base priority. After deleting all boost requests in the pending queue and restore list (at block 316) or after determining that the new base priority is less than the current base priority (at block 314), the thread determines (at block 318) whether there are boost requests against the thread in the pending queue or restore list for the releasing thread and different mutex. At this point at block 318, any threads in the pending queue or restore list would have a higher priority than the new base priority. If so, the logic ends at block 320; otherwise, the thread sets (at block 322) its base priority to the new base priority. In this way, when a thread alters its own base priority, although the base priority may change, the thread's current priority is set to the highest priority of all queued boost requests for that thread in the restore list and pending queue.

Preferred embodiments provide methods and data structures for insuring that a thread runs at the highest priority of all threads that want access to a resource held by such thread.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to a restore list and pending queue in which boost requests are placed. In further embodiments, the pending queue and restore list may be any list of events, whether such list comprises a queue or any other arrangement of items to be processed. Further the process of placing events in the queue or list may be different depending on how the lists are organized with respect to priority.

The preferred logic of FIGS. 4–10 describes events and steps of the priority inheritance algorithm as occurring in a sequence. However, in alternative embodiments, the sequence of described steps may be altered, and steps may be added or removed.

In preferred embodiments there is a pending queue for each process and a restore list for each thread holding a mutex. In further embodiments a different number of queues may be used to implement the priority inheritance technique of the present invention.

Preferred embodiments were described with respect to threads and processes executing printer related operations. However, the preferred logic of FIGS. 4–10 may apply to any operating system processes and threads which could have priority inversion problems. Preferred embodiments were described with respect to preventing priority inversion for threads accessing a mutex. However, the preferred priority inheritance logic could apply to threads accessing any shared resources, including memory resources, conditional variables, queues, etc.

Preferred embodiments were described as applicable to certain operating systems, such as current versions of the AIX operating system, that do not allow a thread in one process to directly affect or alter the priority of threads executing in other processes. However, the preferred embodiments may be utilized to implement priority inheritance in any type of operating system, including POSIX and non-POSIX compliant systems, and those which allow threads to affect threads executing in other processes. Preferred embodiments provide specific data structures and queues which may be utilized in general for implementing priority inheritance.

Preferred embodiments were described as handling requests for a mutex, or other shared resource, from a thread executing within a process that is different from the process in which the thread holding the mutex executes. However, the preferred logic would apply to boost requests between threads operating within the same process.

Preferred embodiments were implemented within a kernel extension of the operating system which handled priority inheritance procedures. In alternative embodiments, the priority inheritance methods of preferred embodiments may be implemented in the kernel, another part of the operating system or some other program.

In summary, preferred embodiments disclose a system, method, and program for implementing priority inheritance in an operating system. A first list includes a boost request to boost a priority of an indicated thread holding a shared resource to an indicated priority. Further included is a second list. The system processes the boost request in the first list to boost the priority of the indicated thread to the indicated priority. After boosting priority, the system removes the processed boost request from the first list and places the processed boost request in the second list.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing priority inheritance in an operating system, comprising:

providing a first list including a boost request to boost a priority of an indicated thread holding a shared resource to an indicated priority;

providing a second list;

processing the boost request in the first list to boost the priority of the indicated thread to the indicated priority;

removing the processed boost request from the first list and placing the processed boost request in the second list after boosting the priority of the indicated thread to the indicated priority; and processing one boost request in the second list to adjust the priority of the indicated thread to the indicated priority.

2. The method of claim 1, wherein the first and second lists are capable of including multiple boost requests for a same indicated thread for each shared resource held by the indicated thread, further comprising:

submitting a boost request to boost an indicated thread to an indicated priority;

placing the submitted boost request in the first list after determining that the indicated priority of the submitted boost request is higher than both (a) a current priority of the indicated thread and (b) an indicated priority of a pending boost request in the first list for the indicated thread; and placing the submitted boost request in the second list if the indicated priority of the submitted boost request is lower than one of (a) the current priority of the indicated thread and (b) the indicated priority of the pending boost request in the first list for the indicated thread.

3. The method of claim 2, further comprising moving the pending boost request in the first list to the second list if the submitted boost request is in the first list.

4. The method of claim 3, further comprising:

releasing, with a thread, the shared resource;

setting the priority of the releasing thread to the indicated priority of a boost request in the first list for a shared resource different from the released shared resource if the first list includes boost requests toward the releasing thread for different shared resources; and setting the priority of the holding thread to the indicated priority of a boost request in the second list for a shared resource different from the released shared resource if the first list includes no boost requests for the releasing thread and the second list includes boost requests toward the releasing thread for different shared resources moved from the first list to the second list.

5. The method of claim 1, wherein the first list queues boost requests for all threads executing within a process and the second list queues all boost requests for a specific thread executing within the process, wherein there is a second list for each tread holding access to a mutex.

6. The method of claim 1, wherein the boost request in the second list is processed to adjust the priority in response to the indicated thread releasing the shared resource.

7. The method of claim 6, wherein the priority of the indicated thread is adjusted downward when processing the boost request in the second list.

8. A system for implementing priority inheritance, comprising:

(a) a computer system including an operating system, wherein multiple processes including multiple threads are capable of executing within the operating system;

(b) a memory device accessible to the computer system, including:

(i) a first list including a boost request to boost a priority of an indicated thread holding a shared resource to an indicated priority; and (ii) a second list; and (c) program logic executed by the computer, comprising:

(i) means for processing the boost request in the first list to boost the priority of the indicated thread to the indicated priority;

(ii) means for removing the processed boost request from the first list and placing the processed boost request in the second list after boosting the priority of the indicated thread to the indicated priority; and (iii) means for processing one boost request in the second list to adjust the priority of the indicated thread to the indicated priority.

9. The system of claim 8, wherein the first and second lists are capable of including multiple boost requests for a same indicated thread for each shared resource held by the indicated thread, wherein the program logic further comprises:

means for submitting a boost request to boost an indicated thread to an indicated priority;

means for queuing the submitted boost request in the first list after determining that the indicated priority of the submitted boost request is higher than both (a) a current priority of the indicated thread and (b) an indicated priority of a pending boost request in the first list for the indicated thread; and means for queuing the submitted boost request in the second list if the indicated priority of the submitted boost request is lower than one of (a) the current priority of the indicated thread and (b) the indicated priority of the pending boost request in the first list for the indicated thread.

10. The system of claim 9, wherein the program logic further comprises means for moving the pending boost request in the first list to the second list if the submitted boost request is queued in the first list.

11. The system of claim 10, wherein the program logic further comprises:
means for releasing the shared resource;
means for setting the priority of the releasing thread to the indicated priority of a boost request in the first list for a shared resource different from the released shared resource if the first list includes boost requests toward the releasing thread for different shared resources; and
means for setting the priority of the holding thread to the indicated priority of a boost request in the second list for a shared resource different from the released shared resource if the first list includes no boost requests for the releasing thread and the second list includes boost requests toward the releasing thread for different shared resources moved from the first list to the second list.

12. The system of claim 8, wherein the first list queues boost requests for all threads executing within a process and the second list queues all boost requests for a specific thread executing within the process, wherein the memory device further includes a second list for each thread holding access to a mutex.

13. The system of claim 8, wherein the boost request in the second list is processed to adjust the priority in response to the indicated thread releasing the shared resource.

14. The system of claim 13, wherein the priority of the indicated thread is adjusted downward when processing the boost request in the second list.

15. An article of manufacture for use in programming a computer to implement priority inheritance, the article of manufacture comprising computer usable media including at least one computer program embedded therein that causes the computer to perform:
providing a first list including a boost request to boost a priority of an indicated thread holding a shared resource to an indicated priority;
providing a second list;
processing the boost request in the first list to boost the priority of the indicated thread to the indicated priority;
removing the processed boost request from the first list and placing the processed boost request in the second list after boosting the priority of the indicated thread to the indicated priority; and
processing one boost request in the second list to adjust the priority of the indicated thread to the indicated priority.

16. The article of manufacture of claim 15, wherein the first and second lists are capable of including multiple boost requests for a same indicated thread for each shared resource held by the indicated thread, further causing the computer to perform:
submitting a boost request to boost an indicated thread to an indicated priority;
queuing the submitted boost request in the first list after determining that the indicated priority of the submitted boost request is higher than both (a) a current priority of the indicated thread and (b) an indicated priority of a pending boost request in the first list for the indicated thread; and
queuing the submitted boost request in the second list if the indicated priority of the submitted boost request is lower than one of (a) the current priority of the indicated thread and (b) the indicated priority of the pending boost request in the first list for the indicated thread.

17. The article of manufacture of claim 16, further causing the computer to perform moving the pending boost request in the first list to the second list if the submitted boost request is queued in the first list.

18. The article of manufacture of claim 17, further causing the computer to perform:
releasing, with a thread, the shared resource;
setting the priority of the releasing thread to the indicated priority of a boost request in the first list for a shared resource different from the released shared resource if the first list includes boost requests toward the releasing thread for different shared resources; and
setting the priority of the holding thread to the indicated priority of a boost request in the second list for a shared resource different from the released shared resource if the first list includes no boost requests for the releasing thread and the second list includes boost requests toward the releasing thread for different shared resources moved from the first list to the second list.

19. The article of manufacture of claim 15, wherein the first list queues boost requests for all threads executing within a process and the second list queues all boost requests for a specific thread executing within the process, and wherein there is a second list for each thread holding access to a mutex.

20. The article of manufacture of claim 15, wherein the boost request in the second list is processed to adjust the priority in response to the indicated thread releasing the shared resource.

21. The article of manufacture of claim 20, wherein the priority of the indicated thread is adjusted downward when processing the boost request in the second list.

* * * * *